United States Patent [19]

Banda

[11] 4,376,567
[45] * Mar. 15, 1983

[54] LIQUID CRYSTAL DISPLAY DEVICE

[75] Inventor: Shunji Banda, Suwa, Japan

[73] Assignee: Kabushiki Kaisha Suwa Seikosha, Tokyo, Japan

[*] Notice: The portion of the term of this patent subsequent to Nov. 4, 1997, has been disclaimed.

[21] Appl. No.: 157,746

[22] Filed: Jun. 9, 1980

Related U.S. Application Data

[63] Continuation-in-part of Ser. No. 81,403, Oct. 3, 1979, abandoned.

[30] Foreign Application Priority Data

Oct. 3, 1978 [JP] Japan ................. 53-12267

[51] Int. Cl.³ ........................... G02F 1/133
[52] U.S. Cl. ........................ 350/335; 350/334
[58] Field of Search ....................... 350/334, 335

[56] References Cited

U.S. PATENT DOCUMENTS 3,944,331 3/1976 Janning .................... 350/335
4,099,855 7/1978 Wisbey et al. ............. 350/335
4,231,639 11/1980 Banda ..................... 350/335

Primary Examiner—John K. Corbin
Assistant Examiner—Richard F. Gallivan
Attorney, Agent, or Firm—Blum, Kaplan, Friedman, Silberman and Beran

[57] ABSTRACT

A two-layer twisted nematic type liquid crystal display device for providing improved contrast is provided. The interior surfaces of the transparent electrode plates of the cells have been treated so that the long axes of the liuqid crystal molecules adjacent the plates are aligned with the treated direction of the plates. The plates are disposed with the treated directions of opposed surfaces at 90° angles to each other with the treated direction on the intermediate electrode surfaces of each cell being coincidental. Characters of the transparent electrodes are formed on the interior surfaces for forming displays having a reference direction from the upper or 12 o'clock position to the lower or 6 o'clock position. An upper and lower polarization plate having axes of polarization substantially parallel to each other are disposed on the outer surfaces of the device. Improved contrast is obtained in both the upper and lower displays when the device is viewed between the four-thirty and seven-thirty directions.

21 Claims, 5 Drawing Figures

LIQUID CRYSTAL DISPLAY DEVICE

CROSS-REFERENCE TO RELATED APPLICATIONS

This application is a continuation-in-part of my copending application Ser. No. 81,403, filed Oct. 3, 1979 now abandoned.

BACKGROUND OF THE INVENTION

This invention relates generally to a liquid crystal display device and particularly to a two-layer device for providing improved contrast when viewing the display in both layers.

Liquid crystal display devices recently have been used to provide display in various machines, tools, and timepieces. In order to increase the contents of the display, display devices including two liquid crystal layers have been provided. In these conventional two-layer liquid crystal display devices, the particular alignment of the liquid crystal molecules in the cells has not been prescribed in detail. The contrast when observing a display of both layers in the devices has been less than completely satisfactory. Accordingly, it is desirable to provide a two-layer liquid crystal display device having improved contrast when observing both layers and to provide for the manufacture of such devices which is simplified.

SUMMARY OF THE INVENTION

Generally speaking, in accordance with the invention, a two-layer liquid crystal display device for providing improved contrast when viewing a display in both layers is provided. Each liquid crystal display cell of the device includes a twisted nematic type liquid crystal material disposed between transparent electrode substrates which have been unidirectionally treated so that the long axes of the liquid crystal molecules adjacent the substrate align themselves in the treated directions with the directions disposed at 90° clockwise to each other. The treated direction of the upper surface of the lower substrate of the upper cell and the lower surface of the upper substrate of the lower cell are coincidental.

Transparent electrodes are disposed on the interior opposed surfaces in each cell for forming characters aligned in a reference direction from the top or 12 o'clock position to the lower or 6 o'clock position which is referred to as a 12 to 6 o'clock reference direction, the display of the characters being viewed from the 6 o'clock position. A pair of polarizing plates having axes of polarization substantially parallel to each other are disposed on the upper and opposed lower surface of the device.

In an exemplary embodiment of the invention, the lower substrate of the upper cell and the upper substrate of the lower cell are one intermediate substrate. The long axes of the liquid crystal material adjacent the upper substrate of the upper cell is substantially perpendicular to the axes of polarization of the upper polarizer. The long axes of the liquid crystal material adjacent the lower substrate of the lower cell is substantially perpendicular to the polarization axis of the lower polarizer. In this embodiment the vibrating plane of polarized light is always perpendicular to the long axes of the liquid crystal molecules in both upper and lower cells. In liquid crystal display devices in accordance with the invention the best contrast displays in both upper and lower cells is obtained when the device is viewed between the four-thirty and seven-thirty directions.

Accordingly, it is an object of the invention to provide an improved two-layer liquid crystal display device with improved contrast in both layers.

A further object of the invention is to provide an improved two-layer liquid crystal display device wherein light absorption is reduced by limiting the vibrating direction of the light penatrating the device to be perpendicular to the direction of the long axes of the liquid crystal molecules.

Still another object of the invention is to provide an improved twisted nematic liquid crystal display device including two layers.

Another object of the invention is to provide an improved liquid crystal display device wherein the twisting direction of the liquid crystal material in both cells is in the same direction.

Yet another object of the invention is to provide an improved two-layer liquid crystal display device having improved uniformity of display contrast in both the upper and lower layer when the display device is viewed from the 6 o'clock direction.

Still another object of the invention is to provide an improved two-layer liquid crystal display device which is easy to manufacture by utilizing the same twisted nematic liquid crystal material in each display cell.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
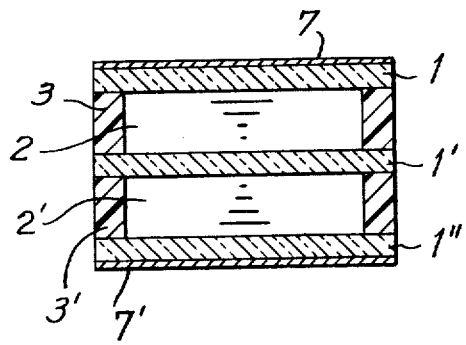
FIG. 1 is a cross-sectional schematic representation of a two-layer liquid crystal display device constructed and arranged in accordance with the invention.

Referring now to FIG. 1, a cross-sectional view of a two-layer liquid crystal display device constructed and arranged in accordance with the invention is shown. The device includes an upper cell formed from an upper transparent plate 1 and an opposed lower plate 1' which serves as an intermediate plate in the device. The upper cell includes a spacer 3 about the periphery of the opposed plate for forming a volume for receiving a liquid crystal material 2. The lower cell formed by intermediate plate 1' which serves as the upper plate and the cell and an opposed transparent plate 1". A spacer 3' disposed about the periphery of the opposed plates forms a volume for receiving a liquid crystal material 2'. The device also includes upper polarization plate 7 and a lower polarization plate 7' disposed on the upper and lower surfaces of the device, respectively.

Figure 2:
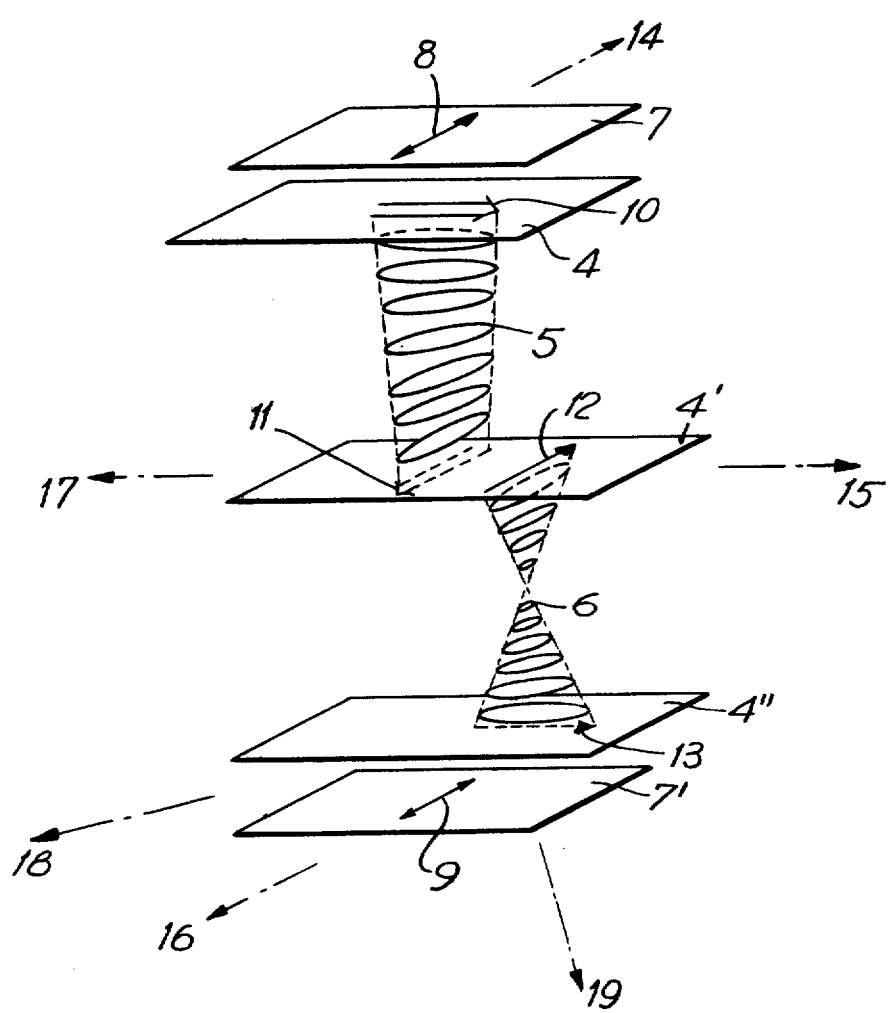
FIG. 2 is a schematic representation of the liquid crystal display device dipicted in FIG. 1.

The details of the invention for providing improved display from both upper and lower cells will be described in detail in connection with FIG. 2. FIG. 2 is an exploded perspective view illustrating a schematic representation of a two-layer liquid crystal display device constructed and arranged in accordance with the invention. The axis of polarization of the polarizing plates and the direction of alignment of the liquid crystal molecules adjacent to the respective transparent plates due to the rubbing direction are shown by arrows as will be described in detail.

Figure 4:
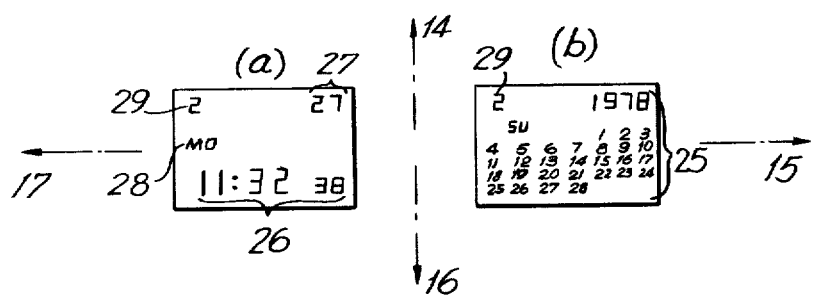
FIG. 4 is a plan view of the display contents in each layer of a liquid crystal display device in accordance with the invention.

The upper cell of the device is formed by an upper transparent plate 4 and an opposed intermediate plate 4' which forms the lower plate of the upper cell. A layer of liquid crystal material 5 is disposed between upper plate 4 and intermediate plate 4'. The interior surface of upper plate 4 has been unidirectionally rubbed in a direction indicated by arrow 10 and the opposed surface of intermediate plate 4' has been unidirectionally rubbed in a direction indicated by arrow 11. Transparent electrode means are disposed on the interior opposed surface of plates 4 and 4' for forming characters and elements of the various displays as illustrated in FIG. 4.

The characters and displays are oriented so that the characters are oriented from the top of the device to the bottom when viewed from the bottom of the device. In other words, the upper portion of the device is referenced as the 12 o'clock direction illustrated by an arrow 14 and the bottom of the display is the 6 o'clock reference direction illustrated by an arrow 16. The intermediate directions to the right or the 3 o'clock reference direction is illustrated by an arrow 15 and the opposed or left direction is the 9 o'clock reference direction illustrated by an arrow 17.

The lower cell of the device is formed by intermediate plate 4' which forms the upper plate of this cell and an opposed lower plate 4". The lower interior surface of intermediate plate 4' has been unidirectionally rubbed in a direction indicated by an arrow 12 and the opposed inner surface of lower plate 4" has been unidirectionally rubbed in a direction indicated by an arrow 13. Thus, when a liquid crystal material 6 is placed between plates 4' and 4", the long axis of the liquid crystal material adjacent to plates 4' and 4" orient themselves in rubbing directions 12 and 13, respectively.

The liquid crystal display device also includes an upper polarization plate 7 having an axis of polarization 8 in the 12 o'clock to 6 o'clock direction and a lower polarization plate 7' having axis of polarization indicated by arrow 9 in the 12 o'clock to 6 o'clock reference direction. In other words, axis of polarization 9 of lower polarization plate 7' is disposed substantially paralled to axis of polarization 8 of upper polarization plate 7.

Using the reference directions noted, due to the rubbing directions of the interior surfaces of the transparent plates, the long axes of the liquid crystal molecules adjacent upper plate 4 in the upper cell oriented themselves from the 9 o'clock to the 3 o'clock reference direction. The liquid crystal molecules 5 adjacent to the upper surface of intermediate plate 4' align themsleves from the 12 o'clock to 6 o'clock reference direction. Accordingly, liquid crystal molecules 5 adjacent opposed surfaces of plates 4 and 4' are rotated 90° clockwise from top to bottom.

Similarly, in the lower cell, liquid crystal molecules 6 adjacent to the lower surface of intermediate plate 4' align themselves from the 6 o'clock to 12 o'clock reference direction indicated by arrow 12, or along the same line formed by the rubbing direction on the upper surface of intermediate plate 4' as indicated by arrow 12. Liquid crystal molecules 6 adjacent the upper surface of lower transparent plate 4" in the lower cell align themselves from the 9 o'clock to 3 o'clock reference direction as indicated by arrow 13. As in the case of liquid crystal molecules 5 in the upper cell, liquid crystal molecules 6 near the lower surface of intermediate plate 4' and the upper surface of lower plate 4" are rotated 90° from each other.

In the embodiment illustrated in FIG. 2, axis of polarization 8 of upper polarization plate 7 is disposed substantially perpendicular to rubbing direction 10 on the inner surface of transparent plate 4. Accordingly, axis of polarization 9 of lower polarization plate 7' is disposed parallel to axis of polarization 8 or is substantially perpendicular to rubbing directions 10 and 13 on plates 4 and 4", respectively. This is the preferred orientation of the rubbing directions and polarization axis for viewing a two-layer liquid crystal display device constructed and arranged in accordance with the invention. In connection with this preferred embodiment, the display device is generally viewed between a seven-thirty direction indicated by an arrow 18 and a four-thirty direction indicated by an arrow 19. This improved viewing region will be described in more detail in connection with the description of FIG. 3.

Liquid crystal material 6 in the lower cell is rotated upwardly from the 9 o'clock to 6 o'clock reference direction 15 to the 12 o'clock to 6 o'clock reference direction 16. Similarly, liquid crystal molecule 5 in the upper cell is rotated upwardly from the 6 o'clock to 12 o'clock reference direction 14 to the 9 o'clock to 3 o'clock reference direction 15. Thus, the rotation throughout the device is clockwise 90°. Accordingly, the liquid crystal material in both upper and lower cells may contain the same chemical additive for controlling the twist direction. Therefore, a hole (not shown) may be provided in intermediate transparent plate 4' and the liquid crystal display device may be filled with the same liquid crystal material and hermetically sealed in one processing step. Utilizing the same liquid crystal material in each cell is clearly an advantage during manufacture of a device in accordance with the invention.

Figure 3:
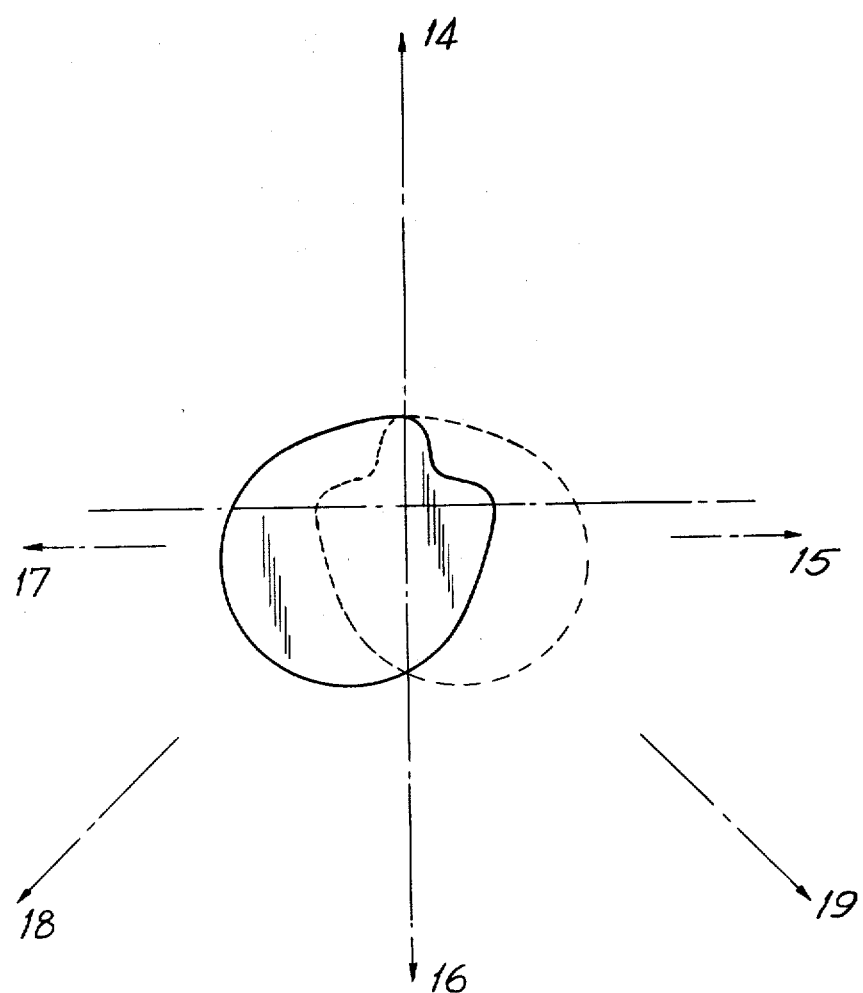
FIG. 3 is a distributional diagram of contrast of the liquid crystal display device dipicted in FIG. 1.

When axis of polarization 8 of upper polarizing plate 7 and axis of polarization 9 of lower polarizing plate 7' are as illustrated in FIG. 2, the vibrating direction of transmitted light in the device is always substantially perpendicular to the direction of the long axes of liquid crystal molecules 5 and liquid crystal molecules 6 in each crystal layer. Accordingly, light absorption in the liquid crystal display device is minimized and a bright display may be obtained. For the construction as illustrated in FIG. 2, the relationship between the direction of observation and the distribution of contrast is illustrated in FIG. 3. The solid line depicts the distribution of contrast of the display in the upper cell. The broken line illustrates the distribution of contrast and angle of clear viewing when viewing a display in the lower cell. Reference directions 14, 15, 16 and 17 coincide with the 12 o'clock, 3 o'clock, 6 o'clock and 9 o'clock directions, respectively, as in FIG. 2. Thus, best results may be obtained when viewing the upper cell from seven-thirty direction 18. Similarly, best contrast may be obtained when viewing the lower cell if viewed from four-thirty reference direction 19 and best angle of viewing is 6 o'clock direction 16 for viewing a display of the upper and/or lower cells. In the construction in accordance with the invention, uniformity of display contrast is obtained between seven-thirty direction 18 and four-thirty direction 10.

Referring now to FIG. 4, the reference directional relationship and the display formed from the transparent electrode characters disposed on the interior surface of the transparent plates are illustrated. Display (a) is an upper timepiece display and (b) is the lower display. Illustration (a) includes a display of actual time 26, a date display 27 and a day display 28 on the upper cell and a month display 29 formed on the lower cell. This illustration (a) shows the 11th hour, 32nd minute and 38th second on Monday, February 27. Accordingly, in this particular display, display 27, the numeral "27" is displayed in the lower cell and the remaining displays are provided in the upper liquid crystal display cell. Illustration (b) dipicts an example where the display mode has been changed over by an user actuatable switch and an internal circuitry (not shown). In this case, a full calendar for the month of February, 1978 25 is displayed in the same region as the display illustrated in display (a). The numeral 2 appearing in display (b) is displayed in the upper liquid crystal cell and the remaining characters are displayed in the lower liquid crystal layer. Thus, the angle of clear viewing as shown in FIG. 3 is important as the display includes characters from both cells.

Figure 5:
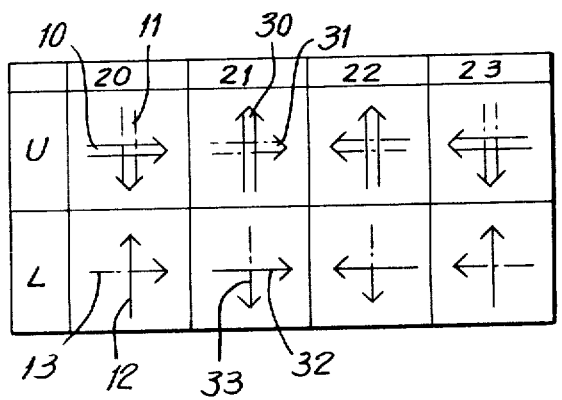
FIG. 5 is a schematic illustration of the several embodiments illustrating the direction of the long axes of the liquid crystal material utilized in accordance with the several embodiments according to the invention.

Referring now to FIG. 5, a schematic illustration of the embodiments dipicting the variation in direction of the long axes of the liquid crystal molecules and their rotation in each layer is illustrated. The direction of the long axes of the liquid crystal material in the embodiment illustrated in FIG. 2 is shown under reference numeral 20. U and L refer to the upper and lower liquid crystal display cells, respectively. In each case, the broken lines illustrate the rubbing direction on the inner surface of the transparent plates which are in touch with the liquid crystal molecules in the lower portion of the respective liquid crystal cell. The solid lines illustrate the rubbing direction of the interior surfaces of the transparent plates which are in touch with the liquid crystal molecules in the upper portions of the respective liquid crystal display cells.

As mentioned above, the embodiment illustrated in FIG. 2 is shown under reference numeral 20. The remaining embodiments in accordance with the invention are illustrated under numerals 21, 22 and 23.

Referring to embodiment 21, the upper layer U, rubbing direction 30 is on the interior surface of transparent plate 4 and is from the 6 o'clock to 12 o'clock direction. Therefore, liquid crystal molecules 5 orient themselves in reference direction 14 as illustrated by solid double arrow 30. The upper surface of intermediate plate 4' is rubbed in the 9 o'clock to 3 o'clock reference direction so that the long axis of the liquid crystal molecules align themselves inreference direction 15 as illustrated by the broken double arrow 31. The lower cell of embodiment 21, the long axis of the liquid crystal molecule align themselves in reference direction 15 as the lower surface of immediate plate 4' has been rubbed in the same direction as the upper surface. This is illustrated by a solid arrow 32. Finally, the upper surface of transparent plate 4" has been rubbed from the 12 o'clock to 6 o'clock direction so that the liquid crystal molecules adjacent thereto align themselves in reference direction 16 as illustrated on a broken arrow 33. In embodiments 22 and 23 the corresponding rubbing and orienting directions of the liquid crystal molecule hold true as illustrated in the remainder in FIG. 5.

In each case the axis of polarization 8 of upper polarizing plate 7 is disposed at a 90° angle to the rubbing direction on the interior surface of upper transparent plate 4. Accordingly, in embodiment 20 illustrated in FIG. 2 and embodiment 23 upper polarizing plate is disposed as shown in FIG. 2. In embodiments 21 and 22 where upper plate 4 has been rubbed between the 6 o'clock and 12 o'clock reference direction, for polarizing plate 7 is disposed so that axis of polarization 8 is rotated 90° from the position illustrated in FIG. 2. The axis of polarization 9 of lower polarizing plate 7' is disposed at a 90° angle to the rubbing direction of the interior surface of lower transparent plate 4". Accordingly, in embodiment 20 illustrated in FIG. 2 and embodiment 23, lower polarizing plate is disposed as shown in FIG. 2. In embodiments 21 and 22 where lower plate 4" has been rubbed between the 6 o'clock and 12 o'clock reference direction, polarizing plate 7' is disposed so that polarizing axis 9 is rotated 90° from the position illustrated in FIG. 2. Therefore, in each embodiment illustrated in FIG. 5 in accordance with the invention, the vibrating direction of the transmitted light is always perpendicular to the liquid crystal molecules adjacent in the device for improving contrast.

When constructing and arranging a two-layer liquid crystal display device in accordance with these embodiments, the objects of the invention are readily obtained. As noted above, these embodiments have been described for the case where the liquid crystal molecules have been aligned by unidirectional rubbing. However, the invention is equally applicable wherein the liquid crystal molecules have been aligned by angular deposition. The objects of the invention can be obtained in accordance with this method by adapting the depositing direction to provide the same alignment provided by the unidirectional rubbing method.

As noted above, constructing and arranging a two-layer liquid crystal display device in accordance with the invention provides the greatest improvements in display contrast of each respective display cell when viewed from the 6 o'clock reference direction. Good contrast is obtained when viewing both cells at an angle between the seven-thirty to four-thirty directions. Furthermore, by rotating the rubbing direction of opposed plates in the same direction, the same liquid crystal material may be used in each of the cells of the device. Significantly, light absorption in the liquid crystal layers is minimized in the device constructed in accordance with the invention.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A liquid crystal display device comprising:
    a first upper liquid crystal display cell including an upper and an opposed lower transparent plate, the interior surface of said plates having been treated for aligning the long axis of a liquid crystal molecule in an aligned direction, said interior surfaces having transparent electrode means disposed thereon for forming characters aligned in a reference direction between the 12 and 6 o'clock direction when viewed from the 6 o'clock direction and a twisted nematic liquid crystal material disposed between said plates;
    a second lower liquid crystal display cell, sequentially arranged with respect to said first cell, including an upper and an opposed lower transparent plate, the interior surfaces of said plates having been treated for aligning the long axis of a liquid crystal molecule in an aligned direction and having transparent electrode means disposed thereon for forming characters aligned in said 12 and 6 o'clock reference direction and a twisted nematic liquid crystal material disposed between said plates;
    the aligned directions of each plate and the long axes of the liquid crystal molecules adjacent each plate in each cell disposed at 90° angles to each other and the lower plate of the upper cell and the upper plate of the lower cell unidirectionally aligned in the same direction;
    an upper polarizing plate having an axis of polarization in a first polarizing direction on the outer surface of said first cell; and
    a lower polarizing plate having an axis of polarization in a second polarizing direction which is substantially parallel to the first polarizing direction on the lower surface of said second cell;
    whereby improved contrast in the display formed by said characters is obtained in both the upper and lower cells when observed between the four-thirty and seven-thirty directions.

2. The liquid crystal display device of claim 1, wherein said first polarizing direction is substantially perpendicular to the aligned direction of the interior surface of said upper plate of the upper cell.

3. The liquid crystal display device of claim 2, wherein the long axes of the liquid crystal molecules adjacent the lower plate of the lower liquid crystal cell are aligned in the 9 o'clock to 3 o'clock direction, the long axes of the liquid crystal molecules adjacent the upper plate of the lower cell are aligned in the 6 o'clock to 12 o'clock direction, the long axes of the liquid crystal molecules adjacent the lower plate of the upper cell are aligned on the 12 o'clock to 6 o'clock direction and the long axes of the liquid crystal molecules adjacent the upper plate of the upper cell are aligned in the 9 o'clock to 3 o'clock direction, whereby the direction from which the best contrast can be viewed in the displays of the upper and lower cells is between the four-thirty and seven-thirty directions.

4. The liquid crystal display device of claim 2, wherein the long axes of the liquid crystal molecules adjacent the lower plate of the lower liquid crystal cell are aligned in the 12 o'clock to 6 o'clock direction, the long axes of the liquid crystal molecules adjacent the upper plate of the lower cell are aligned in the 9 o'clock to 3 o'clock direction, the long axes of the liquid crystal molecules adjacent the lower plate of the upper cell are aligned in the 9 o'clock to 3 o'clock direction and the long axes of the liquid crystal molecules adjacent the upper plate of the upper layer are aligned in the 6 o'clock to 12 o'clock direction, whereby the direction from which the best contrast can be obtained for viewing the displays in the upper and lower cells in between the four-thirty and seven-thirty directions.

5. The liquid crystal display device of claim 2, wherein the long axes of the liquid crystal molecules adjacent the lower plate of the lower liquid crystal cell are aligned in the 12 o'clock to 6 o'clock direction, the long axes of the liquid crystal molecules adjacent the upper plates of the lower cell are aligned in the 3 o'clock to 9 o'clock direction, the long axes of the liquid crystal molecules adjacent the lower plate of the upper cell are aligned in the 3 o'clock to 9 o'clock direction and the long axes of the liquid crystal molecules adjacent the upper plate of the upper cell are aligned in the 6 o'clock to 12 o'clock direction, whereby the direction from which the best contrast can be obtained in the displays in both said upper and lower cell is between the four-thirty and seven-thirty direction.

6. The liquid crystal display device of claim 2, wherein the long axes of the liquid crystal molecules adjacent the lower plate of the lower liquid crystal cell are aligned in the 3 o'clock to 9 o'clock direction, the long axes of the liquid crystal molecules adjacent the upper plate of the lower cell are aligned in the 6 o'clock to 12 o'clock direction, the long axes of the liquid crystal molecules adjacent the lower plate of the upper cell are aligned in the 12 o'clock to 6 o'clock direction and the long axes of the liquid crystal molecules adjacent the upper plate of the upper cell are aligned in the 3 o'clock to 9 o'clock direction, whereby the direction from which the best contrast can be obtained in the displays in both the upper and lower cell is between the four-thirty and seven-thirty directions.

7. The liquid crystal display device of claims 3, 4, 5 or 6, wherein said lower plate of the upper cell and the upper plate of the lower cell are coincidental for forming an intermediate plate.

8. The liquid crystal display device of claim 7, wherein said twisted nematic liquid crystal material in each cell is the same liquid crystal material.

9. The liquid crystal display device of claim 7, wherein said intermediate plate is formed with an opening for filling said display device with liquid crystal material.

10. The liquid crystal display device of claim 7, wherein a display includes characters simultaneously displayed in both upper and lower cells.

11. The liquid crystal display device of claim 1, wherein the interior surfaces of said plates have been unidirectionally rubbed for aligning the liquid crystal molecules adjacent said plates.

12. The liquid crystal display device of claim 1, wherein the interior surfaces of said plates have been treated by angular deposition for aligning the liquid crystal molecules adjacent said plates.

13. A method for forming a two-layerliquid crystal display device having improved contrast comprising:
    treating the inner surface of an upper transparent electrode substrate, the upper surface of a lower transparent electrode substrate and both surfaces of an intermediate transparent electrode substrate so that the long axes of the crystal molecules adjacent the treated surfaces will be aligned in the treated direction, the treated direction of both surfaces of said intermediate substrate being coincidental;

assemblying the upper cell by placing the upper substrate opposed to the intermediate substrate with the treated directions between the opposed surfaces rotated 90° and placing a spacer about the periphery of the substrates for forming a lower volume for receiving liquid crystal material therein;

forming a fill opening in one of said upper or lower substrates for filling the device with liquid crystal material;

filling the device with a twisted nematic liquid crystal material;

sealing said fill opening in said one substrate;

placing an upper polarization plate on the upper surface of the upper substrate with the axis of polarization of said plate at 90° to the treated direction of the upper substrate; and placing a lower polarization plate having an axes of polarization substantially perpendicular to the axis of polarization of the upper polarization plate on the lower surface of the lower substrate;

the treated surfaces of the transparent electrode substrate having electrodes disposed thereon for forming characters when said display device is activated.

14. The method of claim 13, wherein said treatment for aligning the long axes of the liquid crystal molecules is unidirectionally rubbing the interior surfaces of the substrates.

15. The method of claim 13 wherein the treatment for aligning the long axes of the liquid crystal molecules is angular deposition on the interior surfaces of the substrates.

16. The method of claim 13, wherein said fill opening is formed in the upper substrate.

17. The method of claim 13, wherein said fill opening is sealed by hermetic sealing.

18. An electronic timepiece including a liquid crystal display device comprising:

a first upper liquid crystal display cell including an upper and an opposed lower transparent plate, the interior surface of said plates having been treated for aligning the long axes of a liquid crystal molecule in an aligned direction, and having transparent electrode means disposed thereon for forming characters aligned in a reference direction between the 12 and 6 o'clock direction when the device is viewed from the 6 o'clock direction and a twisted nematic liquid crystal material disposed between said plates;

a second lower liquid crystal display cell, sequentially arranged with respect to said first cell, including an upper and an opposed lower transparent plate, the interior surfaces of said plates having been treated for aligning the long axes of a liquid crystal molecule in an aligned direction and having transparent electrode means disposed theron for forming characters aligned in said 12 to 6 o'clock reference direction and a twisted nematic liquid crystal material disposed between said plates;

the aligned directions of each plate and the long axes of the liquid crystal molecules adjacent each plate in each cell disposed are rotated 90° to each other and the lower plate of the upper cell and the upper plate of the lower cell aligned in the same direction;

an upper polarizing plate having an axis of polarization in a first polarizing direction substantially perpendicular to said aligned direction of the upper plate of the upper cell on the outer surface of said upper cell; and a lower polarizing plate having an axis of polarization in a second polarizing direction which is substantially parallel to the first polarizing direction on the lower surface of said second cell;

whereby improved contrast in the display formed by said characters is obtained in both the upper and lower cells when observed between the four-thirty and seven thirty direction.

19. The timepiece of claim 18 wherein the characters in the upper layer are for displaying at least the actual time and the characters in the lower layer are for displaying at least a full calendar month.

20. The timepiece of claim 19, wherein the characters in the upper layer display actual time in minutes, hours and seconds, day of the week, and month and the characters in the lower layer display at least a full calendar month and the date information.

21. The timepiece of claim 20 wherein the display is one of a first display including actual time, day of week, month and date or a second display including at least month and full calendar display.

* * * * *